US012761483B2

(12) United States Patent
Yu et al.

(10) Patent No.: US 12,761,483 B2
(45) Date of Patent: Oct. 13, 2026

(54) MIXED REALITY DISPLAY DEVICE

(71) Applicant: National Central University, Taoyuan City (TW)

(72) Inventors: Yeh-Wei Yu, Taoyuan City (TW); Ching-Cherng Sun, Taoyuan City (TW); Wen-Kai Lin, Taoyuan City (TW); Tsung-Hsun Yang, Taoyuan City (TW); Guan-Yu Zhu, Taoyuan City (TW); Yu-Chien Wang, Taoyuan City (TW)

(73) Assignee: National Central University, Taoyuan City (TW)

( * ) Notice: Subject to any disclaimer, the term of this patent is extended or adjusted under 35 U.S.C. 154(b) by 289 days.

(21) Appl. No.: 18/786,593

(22) Filed: Jul. 29, 2024

(65) Prior Publication Data

US 2025/0189796 A1 Jun. 12, 2025

(30) Foreign Application Priority Data

Dec. 12, 2023 (TW) ................................ 112148374

(51) Int. Cl.
*G02B 27/01* (2006.01)

(52) U.S. Cl.
CPC ..... *G02B 27/0172* (2013.01); *G02B 27/0179* (2013.01); *G02B 2027/0174* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 10,690,846 | B2 * | 6/2020 | Lyu | G03B 21/2006 |
| 10,768,423 | B2 * | 9/2020 | Kimmel | G02B 6/0016 |
| 11,125,998 | B2 * | 9/2021 | Jarvenpaa | G06T 19/006 |
| 11,350,079 | B2 | 5/2022 | Hua et al. | |
| 12,399,326 | B2 * | 8/2025 | Waldern | G02B 27/0172 |
| 2006/0228073 | A1 * | 10/2006 | Mukawa | G02B 5/18 385/31 |

(Continued)

FOREIGN PATENT DOCUMENTS

| | | | |
|---|---|---|---|
| CN | 104395815 | A | 3/2015 |
| CN | 115202046 | A | 10/2022 |

(Continued)

*Primary Examiner* — Jyotsna V Dabbi
(74) *Attorney, Agent, or Firm* — CKC & Partners Co., LLC

(57) ABSTRACT

A mixed reality display device includes a waveguide element, an image display device, an imaging lens, a first diffractive optical element, a first volume holographic optical element, a second volume holographic optical element and a second diffractive optical element. The image display device is configured to emit a light field image. The imaging lens is configured to image an image at infinity. The first diffractive optical element is configured to guide the image into the waveguide element. The first volume holographic optical element and the second volume holographic optical element have an angle selectivity, configured to extract a specific field of view. The second volume holographic optical element has a lens array function to form a light field image source. The second diffractive optical element has a lens array function to transfer the light field image source into a three-dimensional image.

16 Claims, 11 Drawing Sheets

(56) References Cited

U.S. PATENT DOCUMENTS

| | | | | |
|---|---|---|---|---|
| 2018/0003981 | A1 | 1/2018 | Urey | |
| 2018/0164583 | A1 * | 6/2018 | Wall | G02B 27/1086 |
| 2018/0324402 | A1 * | 11/2018 | Lowney | G02B 6/00 |
| 2019/0107719 | A1 * | 4/2019 | Edwin | G02B 27/0172 |
| 2020/0225479 | A1 * | 7/2020 | Chi | G02F 1/011 |
| 2021/0311316 | A1 * | 10/2021 | TeKolste | G02B 27/0081 |
| 2022/0035161 | A1 * | 2/2022 | Sinay | G02B 27/0172 |

FOREIGN PATENT DOCUMENTS

| | | | |
|---|---|---|---|
| TW | I769479 | B | 7/2022 |
| TW | 202235939 | A | 9/2022 |

* cited by examiner

150

MIXED REALITY DISPLAY DEVICE

CROSS-REFERENCE TO RELATED APPLICATIONS

This application claims priority to Taiwan Application Serial Number 112148374, filed Dec. 12, 2023 which is herein incorporated by reference.

BACKGROUND

Technical Field

The present disclosure relates to a mixed reality display device.

Description of Related Art

Near-eye displays have become the mainstream of mobile displays in recent years. Near-eye displays can be integrated into portable devices such as glasses and head-mounted displays to increase display convenience. In the field of mixed reality (MR) display, exit pupil expansion (EPE) technology is crucial to a viewer's experience. An area of an image incident area is usually much smaller than that of an image exit area, since it is limited by a size of a near-eye display, which is usually much smaller than the area of the image exit area. How to extend an image so that it can be clearly viewed by a human eye from different directions is an important subject for mixed reality near-eye display designers.

SUMMARY

One technical aspect of the present disclosure is a mixed reality display device.

According to an embodiment of the present disclosure, a mixed reality display device comprises a waveguide element, an image display device, an imaging lens, a first diffractive optical element, a first volume holographic optical element, a second volume holographic optical element and a second diffractive optical element. The image display device is located on a first side of the waveguide element, and is configured to emit a light field image. The imaging lens is located between the waveguide element and the image display device, and is configured to image the light field image at infinity, that is, transfer each signal pixel in the image display device into a plane wave at a corresponding angle. The first diffractive optical element is located on a second side of the waveguide element opposite to the first side, and is configured to guide the light field image into the waveguide element. The first volume holographic optical element is located on the second side of the waveguide element, and is configured to guide the light field image. The second volume holographic optical element is located on the first side of the waveguide element, and is configured to guide the light field image, wherein the first volume holographic optical element and the second volume holographic optical element have an angular selectivity, configured to extract a specific viewing angle, and the second volume holographic element has a lens array function to form a light field image source. The second diffractive optical element is located on the second side of the waveguide element and has a lens array function to transfer the light field image source into a three-dimensional image.

In an embodiment of the present disclosure, the first diffractive optical element comprises at least one of a surface structured grating, a liquid crystal grating, a volume holographic element, or a metamaterial.

In an embodiment of the present disclosure, the second diffractive optical element comprises at least one of a surface structured grating, a liquid crystal grating, a volume holographic element, or a metamaterial.

In an embodiment of the present disclosure, the lens array function of the second volume holographic optical element and the lens array function of the second diffractive optical element are configured to generate a viewing-angle magnification function.

In an embodiment of the present disclosure, the second volume holographic optical element comprises a plurality of holographic optical element lenses. The holographic optical element lenses are arranged in an array. Any of the holographic optical element lenses is configured to converge a ray of light.

In an embodiment of the present disclosure, the holographic optical element lenses are produced by a recording of the interference between a plane wave and a spherical wave, and the holographic optical element lenses are produced by repeating the above step at different positions on a same holographic photosensitive film to produce the holographic optical element lenses, so that the second volume holographic optical element is composed into a form of an array.

In an embodiment of the present disclosure, the second diffractive optical element comprises a plurality of diffractive optical element lenses. The diffractive optical element lenses are arranged in an array. Any of the diffractive optical element lenses is configured to diverge or converge a ray of light.

In an embodiment of the present disclosure, any of the holographic optical element lenses in the second volume holographic optical element forms a beam shrinking together with a diffractive optical element lens at a corresponding position in the second diffractive optical element.

In an embodiment of the present disclosure, the first volume holographic optical element comprises a plurality of volume holographic gratings formed at different positions in a same photosensitive material in plane wave interference recording at different angles. The volume holographic gratings are arranged in an array. Each of the volume holographic gratings corresponds to a different Bragg condition.

In an embodiment of the present disclosure, an air layer is provided between the second diffractive optical element and the waveguide element.

In an embodiment of the present disclosure, a mask element is further provided between the second diffractive optical element and the waveguide element. The mask element is configured to eliminate a phenomenon of cross-talk between the diffractive optical element lenses.

In an embodiment of the present disclosure, the mixed reality display device further comprises an eye movement tracking camera. The eye movement tracking camera is located on the first side of the waveguide element.

In an embodiment of the present disclosure, the mixed reality display device further comprises a beam splitter. The beam splitter is located between the waveguide element and the image display device, and is configured to transmit an image of a human eye to the eye movement tracking camera.

In an embodiment of the present disclosure, the mixed reality display device further comprises an eye movement tracking camera and a third volume holographic optical element. The eye movement tracking camera is located on the second side of the waveguide element. The third volume holographic optical element is located on the first side of the waveguide element, and is configured to transmit the image of the human eye to the eye movement tracking camera, wherein the third volume holographic optical element comprises a reflective volume holographic element.

In an embodiment of the present disclosure, the mixed reality display device further comprises an eye movement tracking camera and a third diffractive optical element. The eye movement tracking camera is located on the second side of the waveguide element. The third diffractive optical element is located on the first side of the waveguide element and does not overlap with the image display device in a first direction, and is configured to transmit the image of the human eye to the eye movement tracking camera.

In the above embodiments of the present disclosure, since the image emitted by the image display device of the mixed reality display device is a light field image, and the second diffractive optical element has a lens array function to transfer the light field image into a three-dimensional image, the effect of seeing the 3D image in the mixed reality display device can be achieved. Furthermore, the first volume holographic optical element and the second volume holographic optical element have the angle selectivity, and the lens array function of the second volume holographic optical element and the lens array function of the second diffractive optical element are configured to generate the viewing-angle magnification function, so that the effects of image selection and viewing-angle magnification can be achieved, thereby improving the viewing experience of the mixed reality display device. By using the eye movement tracking camera to capture the image of the human eye passing through the lens array, then deducing the position that the human eye gazes at through a regression algorithm, and feeding it back to the light source to adjust the emitted light field image, the feeling of dizziness caused by the vergence-accommodation conflict (VAC) to the human eye can be effectively reduced.

BRIEF DESCRIPTION OF THE DRAWINGS

Aspects of the present disclosure are best understood from the following description of embodiments when read in conjunction with the drawings. Note that in accordance with standard practice in this industry, various features are not drawn to scale. In fact, dimensions of the various features may be arbitrarily increased or reduced for clarity of discussion.

DETAILED DESCRIPTION

Figure 1:
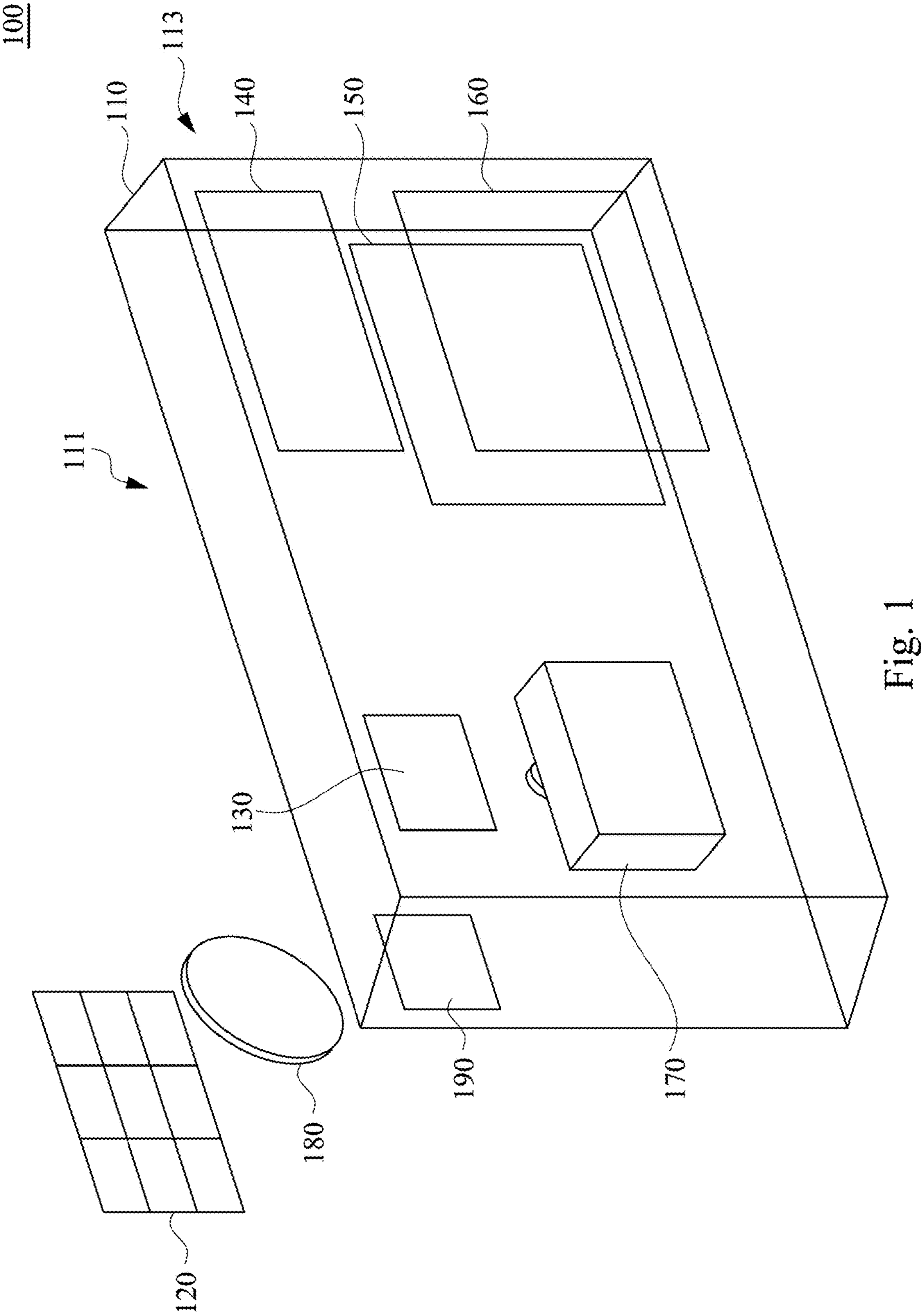
FIG. 1 illustrates a perspective view of a mixed reality display device according to an embodiment of the present disclosure.

The following disclosure of embodiments provides many different embodiments or examples for implementing different features of the provided subject matter. Specific examples of elements and arrangements are described below to simplify the present application. Of course, these examples are examples only and are not intended to be limiting. Additionally, reference symbols and/or letters may be repeated in various examples of the present application. This repetition is for simplicity and clarity, and does not by itself specify a relationship between various embodiments and/or configurations discussed.

Spatial relative terms, such as "below", "under", "lower", "above", "upper", etc., may be used herein for convenience of description, to describe the relationship between one element or feature and another element or feature as illustrated in the drawings. Spatial relative terms are intended to encompass different orientations of a device in use or operation, in addition to the orientations illustrated in the drawings. The device may be otherwise oriented (rotated 90 degrees or at other orientations), and the spatial relative descriptive words used herein may also be interpreted accordingly.

Figure 2:
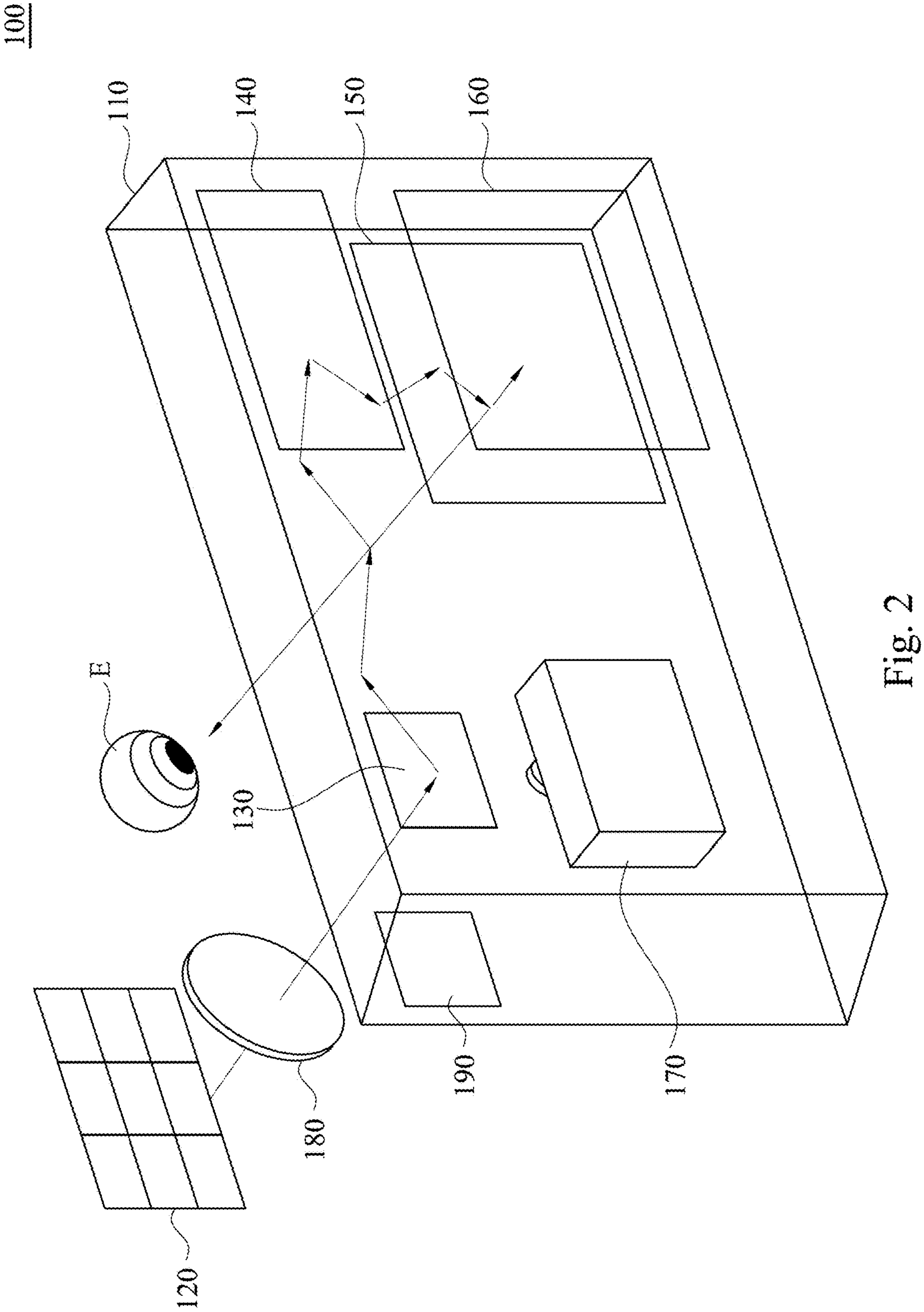
FIG. 2 illustrates a perspective view of the mixed reality display device of FIG. 1 in operation.

FIG. 1 illustrates a perspective view of a mixed reality display device 100 according to an embodiment of the present disclosure. FIG. 2 illustrates a perspective view of the mixed reality display device 100 of FIG. 1 in operation. Referring to FIGS. 1 and 2, the mixed reality display device 100 includes a waveguide element 110, an image display device 120, an imaging lens 180, a first diffractive optical element 130, a first volume holographic optical element 140, a second volume holographic optical element 150 and a second diffractive optical element 160. The image display device 120 is located on a first side 111 of the waveguide element 110, and is configured to emit a light field image. It is clarified first that the so-called "light field image" here and below means that each light-emitting unit (which may be a collection of a number of pixels) in a light-emitting surface emits an independent complete image, thus forming an image array, rather than the entire light-emitting surface emitting one image. The imaging lens 180 is located between the waveguide element 110 and the image display device 120, and is configured to image the light field image at infinity, that is, transfer each signal pixel in the image display device 120 into a plane wave at a corresponding angle. The first diffractive optical element 130 is located on a second side 113 of the waveguide element 110 opposite to the first side 111, and is configured to guide the image into the waveguide element 110. The first volume holographic optical element 140 is located on the second side 113 of the waveguide element 110, and is configured to guide the light field image. The second volume holographic optical element 150 is located on the first side 111 of the waveguide element 110, and is configured to guide the light field image, wherein the first volume holographic optical element 140 and the second volume holographic optical element 150 have an angle selectivity, configured to extract a specific viewing angle, and the second volume holographic optical element 150 has a lens array function to form a light field image source. The second diffractive optical element 160 is located on the second side 113 of the waveguide element 110 and has a lens array function to transfer the light field image source into a three-dimensional image and couple the image out into a human eye E. The so-called "lens array" here and below is a specially produced lens, which is composed of multiple tiny lenses arranged in an array. The lens array function of the second volume holographic optical element 150 and the lens array function of the second diffractive optical element 160 are configured to generate a viewing-angle magnification function.

Since the image emitted by the image display device 120 of the mixed reality display device 100 is a light field image, and the second diffractive optical element 160 has a lens array function to transfer the light field image into a three-dimensional image, the effect of seeing the 3D image in the mixed reality display device 100 can be achieved. Furthermore, the first volume holographic optical element 140 and the second volume holographic optical element 150 have the angle selectivity, and the lens array function of the second volume holographic optical element 150 and the lens array function of the second diffractive optical element 160 are configured to generate the viewing-angle magnification function, so that the effects of selecting an image and magnifying the viewing-angle can be achieved, thereby improving the viewing experience of the mixed reality display device 100.

In some embodiments, the first diffractive optical element 130 includes a surface structured grating, a liquid crystal grating, a volume holographic element, a metamaterial, or other diffractive optical elements. In some embodiments, the second diffractive optical element 160 includes a surface structured grating, a liquid crystal grating, a volume holographic element, a metamaterial, a lens array with a see-through function, or any form of diffractive optical element.

Figure 3:
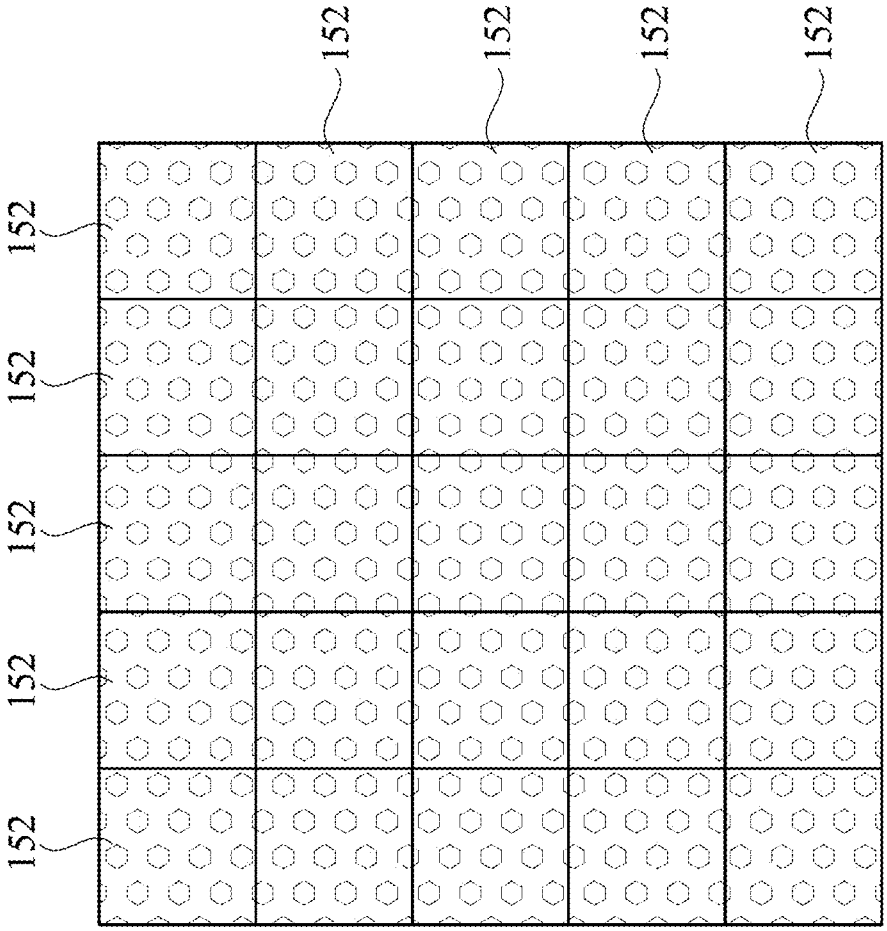
FIG. 3 illustrates a top view of a second volume holographic optical element.

FIG. 3 illustrates a top view of the second volume holographic optical element 150. Referring to FIG. 3, the second volume holographic optical element 150 includes a plurality of holographic optical element lenses 152. The holographic optical element lenses 152 are arranged in an array. Any of the holographic optical element lenses 152 is configured to converge a ray of light. the holographic optical element lenses 152 are produced by a recording of the interference between a plane wave and a spherical wave, and the holographic optical element lenses 152 are produced by repeating the above step at different positions on a same holographic photosensitive film to produce the holographic optical element lenses 152, so that the second volume holographic optical element 150 is composed into a form of an array. In FIG. 2, twenty five holographic optical element lenses 152 are shown, but the present disclosure is not limited thereto. For example, more or less holographic optical element lenses 152 may be produced.

Figure 4:
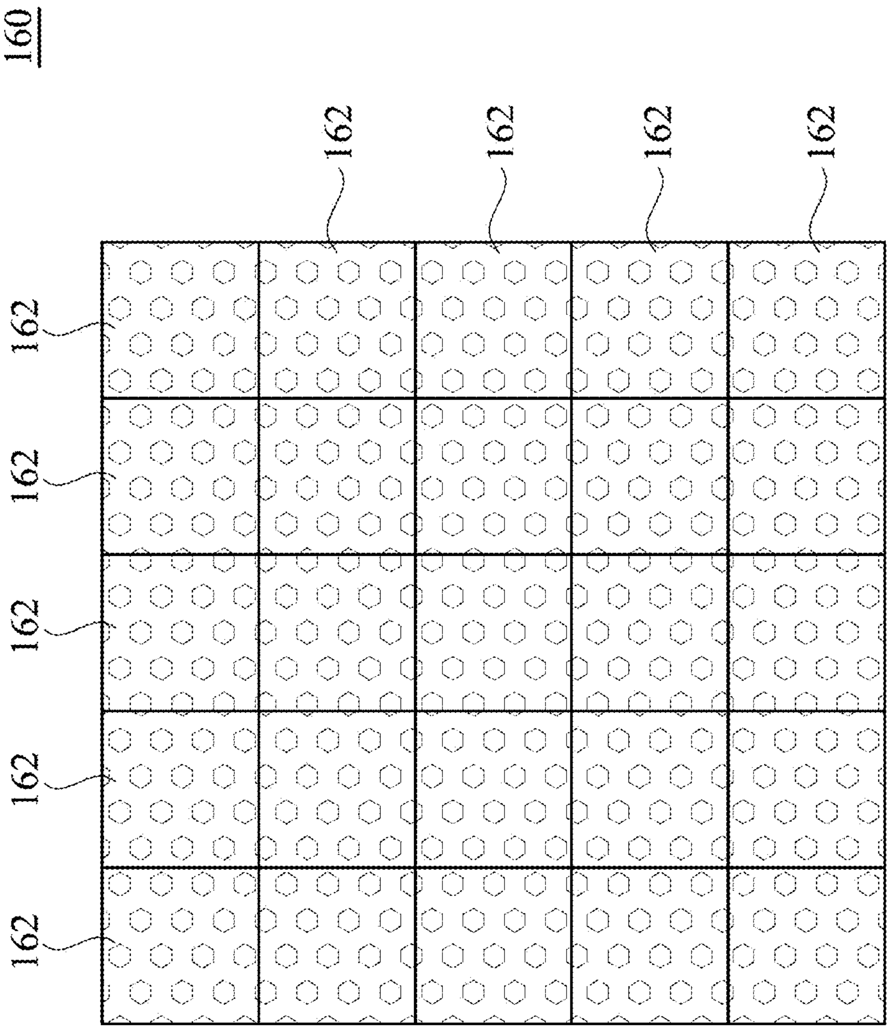
FIG. 4 illustrates a top view of a second diffractive optical element.

FIG. 4 illustrates a top view of the second diffractive optical element 160. Referring to FIG. 4, the second diffractive optical element 160 includes a plurality of diffractive optical element lenses 162. The diffractive optical element lenses 162 are arranged in an array. Any of the diffractive optical element lenses 162 is configured to diverge or converge a ray of light. In FIG. 3, twenty five diffractive optical element lenses 162 are shown, but the present disclosure is not limited thereto. For example, more or less diffractive optical element lenses 162 may be produced.

Figure 5:
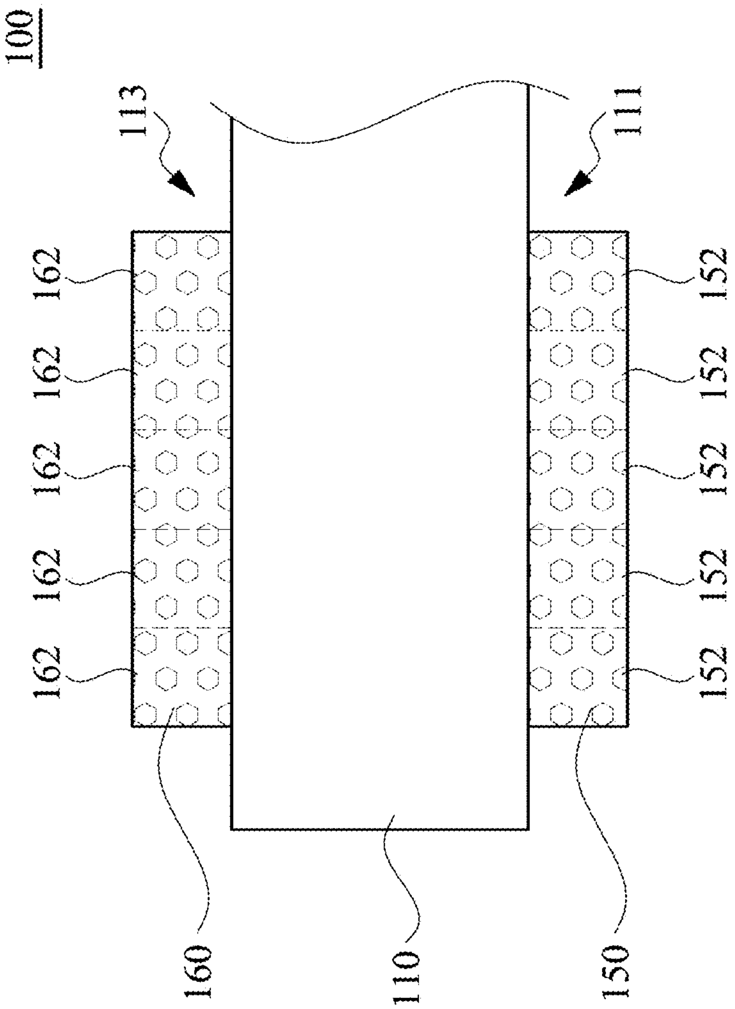
FIG. 5 illustrates a partial enlarged bottom view of the second volume holographic optical element, a waveguide element and the second diffractive optical element of FIG. 1.

FIG. 5 illustrates a partial enlarged bottom view of the second volume holographic optical element 150, the waveguide element 110 and the second diffractive optical element 160 of FIG. 1. Referring to FIG. 5, any of the holographic optical element lenses 152 in the second volume holographic optical element 150 forms a beam shrinking afocal system together with a diffractive optical element lens 162 that corresponds in position in the second diffractive optical element 160. That is to say, a set of holographic optical element lens 152 and diffractive optical element lens 162 that correspond in upper and lower positions (for example, which are the leftmost holographic optical element lens 152 and diffractive optical element lens 162 in FIG. 5) form one beam shrinking afocal system together, that is, there are five groups of afocal systems shown in FIG. 5. After the holographic optical element lens 152 and the diffractive optical element lens 162 form the afocal system, the afocal system's ability to change the image angle magnification can be used to magnify the viewing angle of the image.

Figure 6:
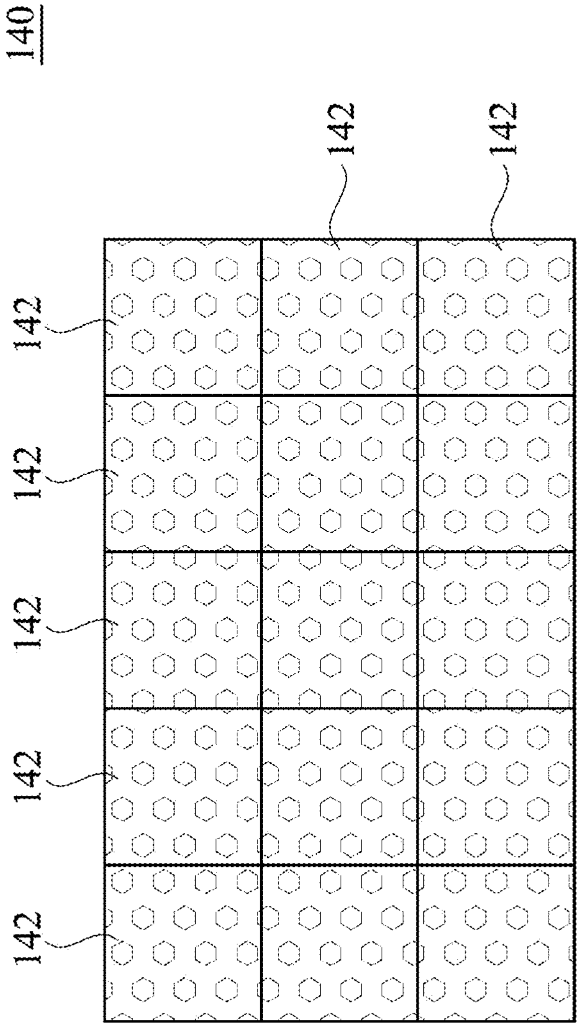
FIG. 6 illustrates a top view of a first holographic optical element.

FIG. 6 illustrates a top view of the first volume holographic optical element 140. Referring to FIG. 6, the first volume holographic optical element 140 includes a plurality of volume holographic gratings (VHG) formed at different positions in a same photosensitive material in plane wave interference recording at different angles. The volume holographic gratings 142 are arranged in an array. Each of the volume holographic gratings 142 corresponds to a different Bragg condition. In FIG. 3, fifteen volume holographic gratings 142 are shown, but the present disclosure is not limited thereto. For example, more or less volume holographic gratings 142 may be produced.

Figure 7:
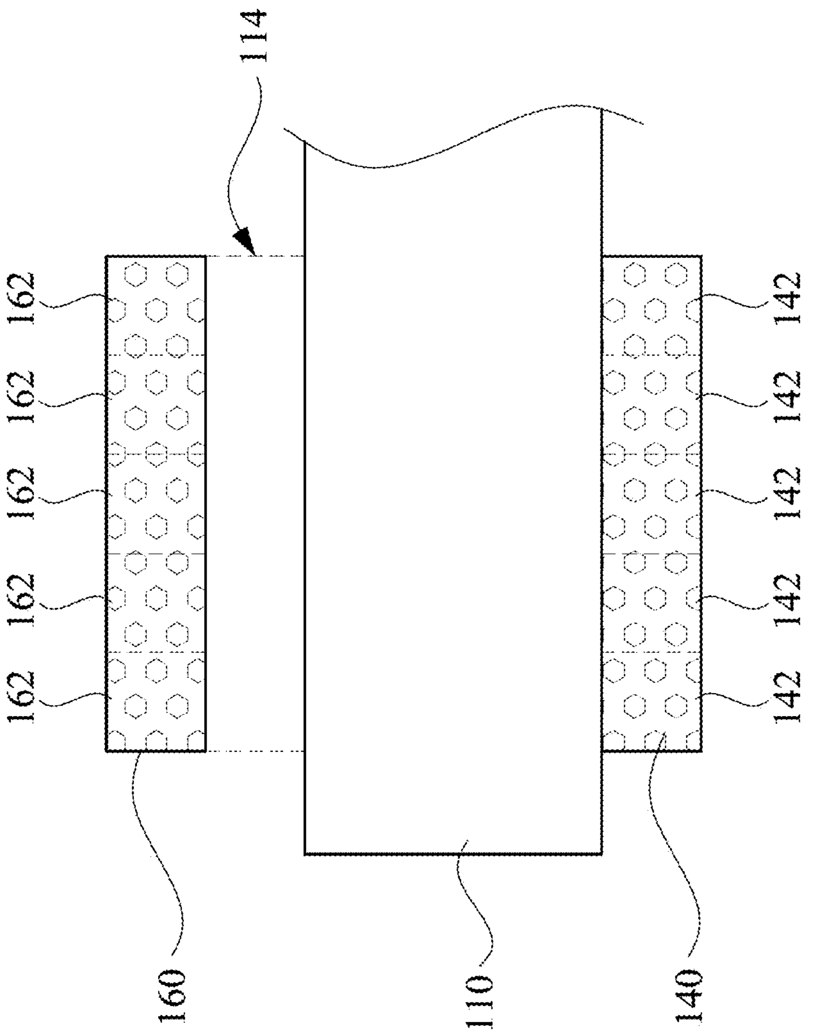
FIG. 7 illustrates a partial enlarged view of a region of a second volume holographic optical element, a waveguide element and a second diffractive optical element according to another embodiment of the present disclosure.

FIG. 7 illustrates a partial enlarged view of a region of the second volume holographic optical element 150, the waveguide element 110 and the second diffractive optical element 160 according to another embodiment of the present disclosure. Referring to FIG. 7, the difference between this embodiment and the embodiment shown in FIG. 5 is that in this embodiment, an air layer 114 is provided between the second diffractive optical element 160 and the waveguide element 110. The air layer 114 may allow one of the holographic optical element lenses 152 in the second volume holographic optical element 150 (for example, which is the leftmost holographic optical element lens 152 in FIG. 7) to be able to form an afocal system together with one that corresponds in position of the diffractive optical element lenses 162 in the second diffractive optical element 160 (for example, which is the leftmost diffractive optical element lens 162 in FIG. 7), thereby achieving the same effect as the embodiment in FIG. 1.

Figure 8:
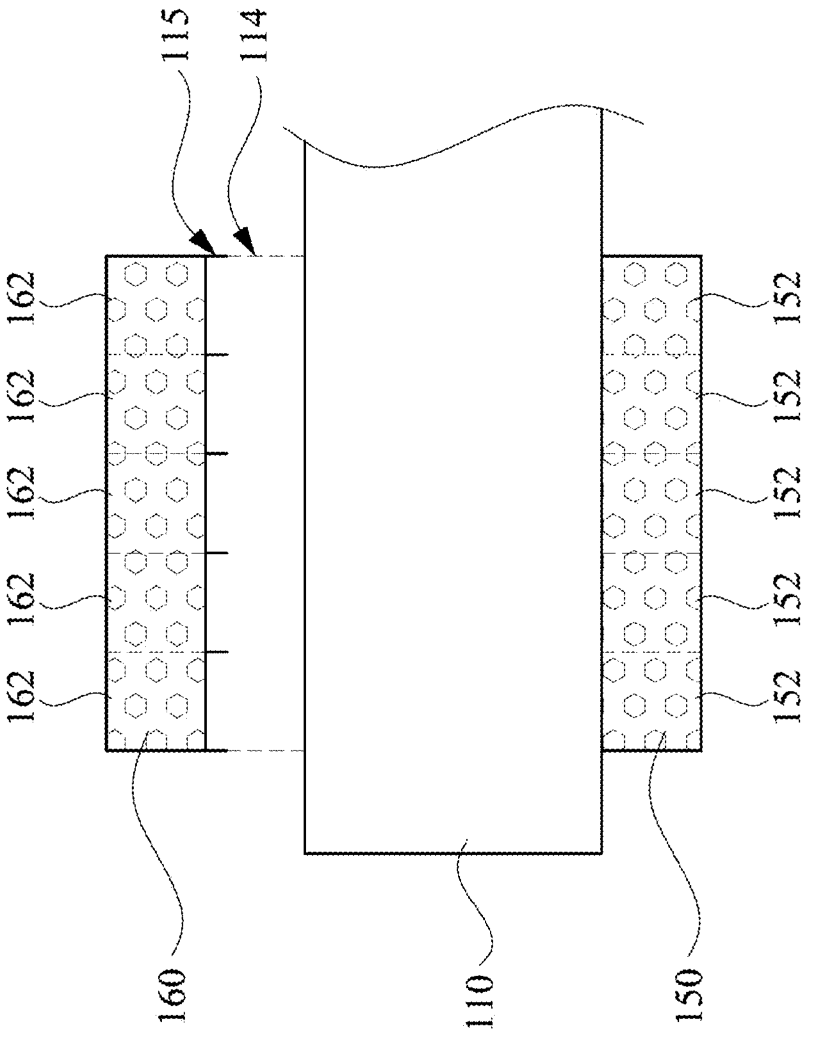
FIG. 8 illustrates a partial enlarged view of a region of a second volume holographic optical element, a waveguide element and a second diffractive optical element according to yet another embodiment of the present disclosure.

FIG. 8 illustrates a partial enlarged view of a region of the second volume holographic optical element 150, the waveguide element 110 and the second diffractive optical element 160 according to yet another embodiment of the present disclosure. Referring to FIG. 8, the difference between this embodiment and the embodiment of FIG. 7 is that in this embodiment, a mask element 115 is further provided between the second diffractive optical element 160 and the waveguide element 110. The mask element 115 is configured to eliminate a phenomenon of crosstalk between the diffractive optical element lenses 162, so that the image quality can be improved.

The holographic optical element lenses 152 diffract particular polarization light to form diffraction light, and the polarization of the diffraction light of each diffractive optical element lens is orthogonal to the polarization of the diffraction light from its neighboring diffractive optical element lens. Such that the crosstalk between the diffractive optical element lenses can be eliminated.

The diffractive optical element lenses 162 diffract particular polarization light to form diffraction light, and the polarization of the diffraction light of each diffractive optical element lens is orthogonal to the polarization of the diffraction light from its neighboring diffractive optical element lens. Such that the crosstalk between the diffractive optical element lenses can be eliminated.

The above-mentioned embodiments of FIGS. 7 and 8 may be employed in the mixed reality display device 100 of FIG. 1.

Figure 9:
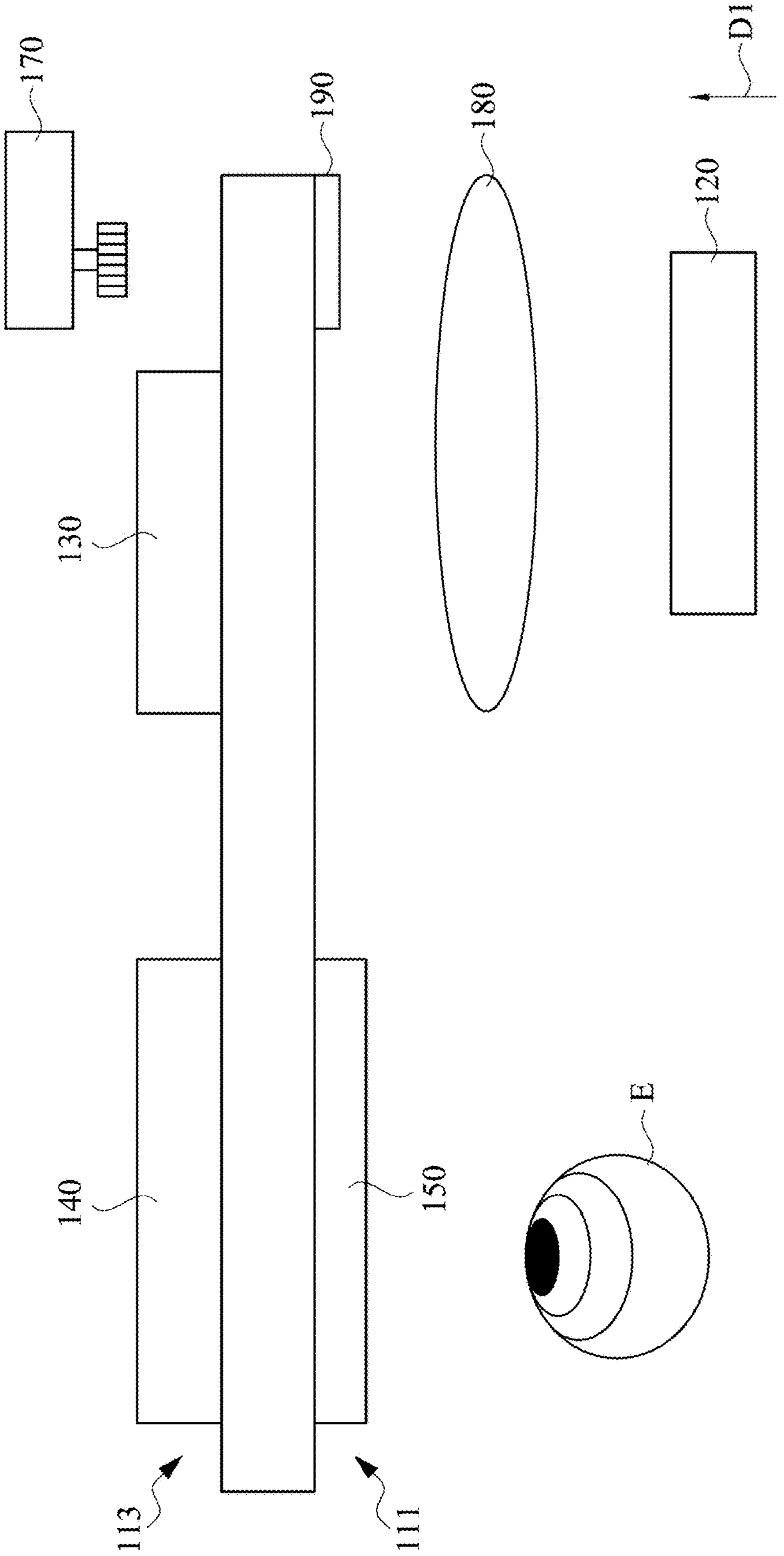
FIG. 9 illustrates a top view of the mixed reality display device of FIG. 1.

FIG. 9 illustrates a top view of the mixed reality display device 100 of FIG. 1. Referring to FIG. 9, the mixed reality display device 100 further includes an eye movement tracking camera 170 and a third diffractive optical element 190. The eye movement tracking camera 170 is located on the second side 113 of the waveguide element 110. The third diffractive optical element 190 is located on the first side 111 of the waveguide element 110 and does not overlap with the image display device 120 in a first direction D1, and is configured to transmit an image of the human eye E to the eye movement tracking camera 170. The third diffractive optical element 190 needs to be located outside an image optical path, so the third diffractive optical element 190 does not overlap with the image display device 120 in the first direction D1, and the third diffractive optical element 190 does not overlap with the imaging lens 180 in the first direction D1. When in use, the image of the human eye E will be coupled from the second diffractive optical element 160 (see FIG. 1) into the waveguide element 110, then transmitted to the second volume holographic optical element 150, then transmitted to the first volume holographic optical element 140, and finally transmitted to the third diffractive optical element 190 and coupled out to the eye movement tracking camera 170.

By using the eye movement tracking camera 170 to capture the image of the human eye E passing through the lens array, then deducing the position that the human eye gazes at through a regression algorithm, and feeding it back to the image display device 120 to adjust the emitted light field image, the feeling of dizziness caused by the vergence-accommodation conflict (VAC) to the human eye can be effectively reduced.

Figure 10:
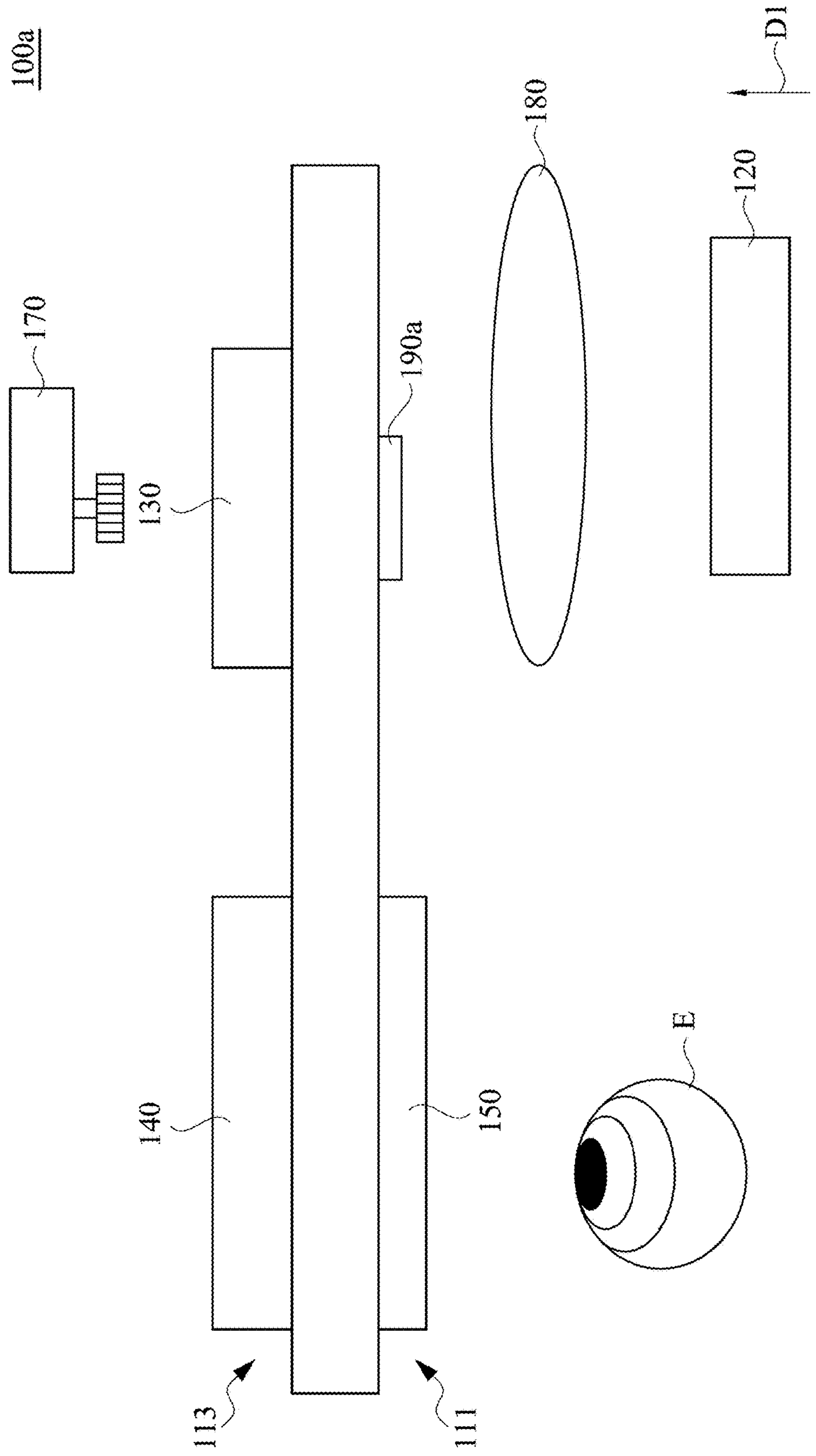
FIG. 10 illustrates a top view of a mixed reality display device according to another embodiment of the present disclosure.

FIG. 10 illustrates a top view of a mixed reality display device 100*a* according to another embodiment of the present disclosure. Referring to FIG. 10, the difference between this embodiment and the embodiment of FIG. 9 is that in this embodiment, the mixed reality display device 100 does not include the third diffractive optical element 190 (see FIG. 9), but a third volume holographic optical element 190*a*. The third volume holographic optical element 190*a* is located on the first side 111 of the waveguide element 110, and is configured to transmit the image of the human eye E to the eye movement tracking camera 170. In this embodiment, the third volume holographic optical element 190*a* includes a reflective volume holographic element, so it does not affect the transmission of the image light path. Therefore, the third volume holographic optical element 190*a* may overlap with the first diffractive optical element 130 or the imaging lens 180.

Figure 11:
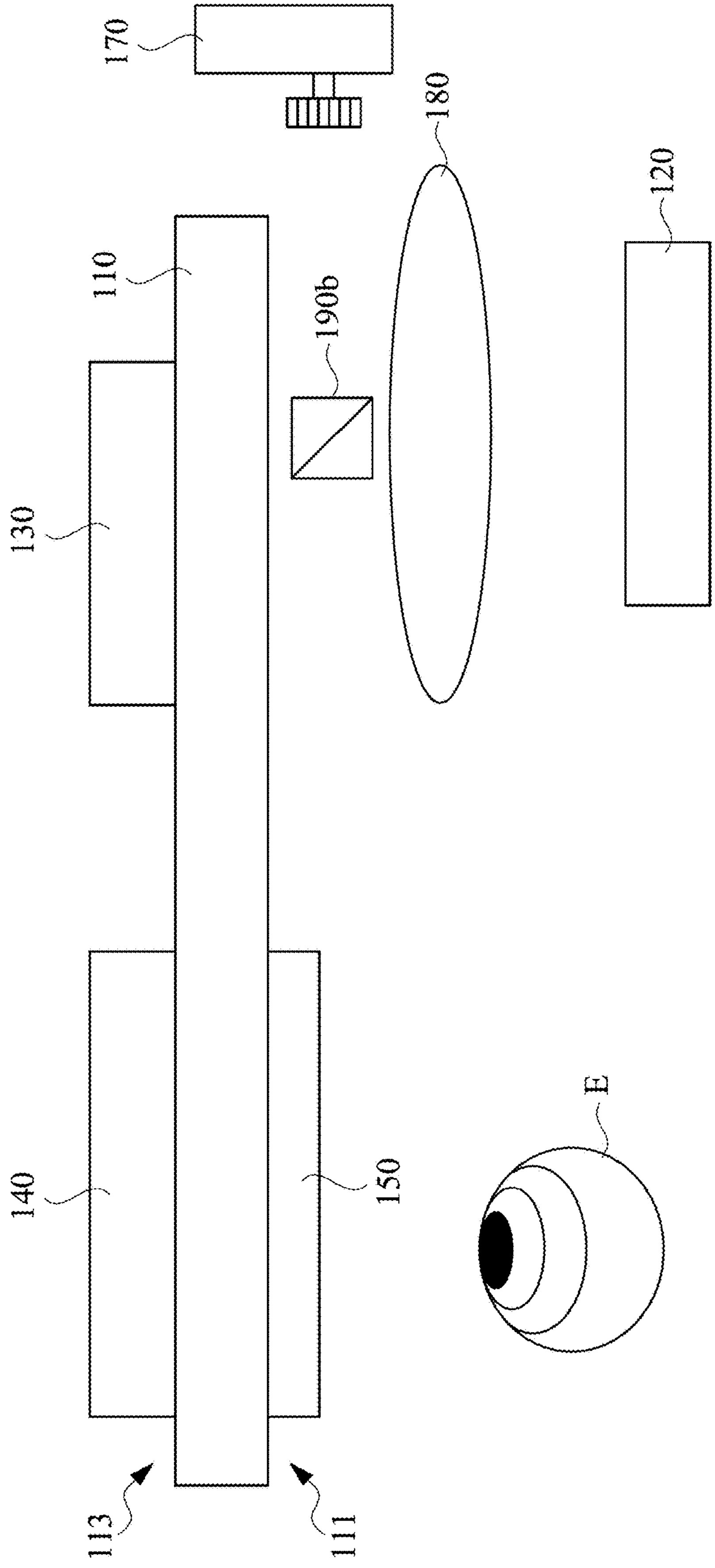
FIG. 11 illustrates a top view of a mixed reality display device according to yet another embodiment of the present disclosure.

FIG. 11 illustrates a top view of a mixed reality display device 100*b* according to yet another embodiment of the present disclosure. Referring to FIG. 11, the difference between this embodiment and the embodiment of FIG. 9 is that in this embodiment, the eye movement tracking camera 170 is located on the first side 111 of the waveguide element 110. In addition, the mixed reality display device 100 further includes a beam splitter 190*b*. The beam splitter 190*b* is located between the waveguide element 110 and the image display device 120, and is configured to transmit the image of the human eye E to the eye movement tracking camera 170.

The foregoing outlines features of several embodiments, so that those skilled in the art may better understand the aspects of the present disclosure. It should be understood by those skilled in the art that they may readily use the present disclosure as a basis for designing or modifying other processes and structures, for realizing the same purposes and/or achieving the same advantages as the embodiments introduced herein. It should be recognized by those skilled in the art that such equivalent constructions do not depart from the spirit and scope of the present disclosure, and that they can be variously changed, substituted, and altered herein without departing from the spirit and scope of the present disclosure.

What is claimed is:

1. A mixed reality display device, comprising:

a waveguide element;

an image display device located on a first side of the waveguide element and configured to emit a light field image;

an imaging lens located between the waveguide element and the image display device and configured to image the light field image at infinity;

a first diffractive optical element located on a second side of the waveguide element opposite to the first side and configured to guide the light field image into the waveguide element;

a first volume holographic optical element located on the second side of the waveguide element and configured to guide the light field image;

a second volume holographic optical element located on the first side of the waveguide element and configured to guide the light field image, wherein the first volume holographic optical element and the second volume holographic optical element have an angular selectivity, configured to extract a specific viewing angle, and the second volume holographic optical element has a lens array function to form a light field image source; and a second diffractive optical element located on the second side of the waveguide element and having a lens array function to transfer the light field image source into a three-dimensional image.

2. The mixed reality display device of claim 1, wherein the first diffractive optical element comprises at least one of a surface structured grating, a liquid crystal grating, a volume holographic element, or a metamaterial.

3. The mixed reality display device of claim 1, wherein the second diffractive optical element comprises at least one of a surface structured grating, a liquid crystal grating, a volume holographic element, or a metamaterial.

4. The mixed reality display device of claim 1, wherein the lens array function of the second volume holographic optical element and the lens array function of the second diffractive optical element are configured to generate a viewing-angle magnification function.

5. The mixed reality display device according to claim 1, wherein the second volume holographic optical element comprises a plurality of holographic optical element lenses, the holographic optical element lenses being arranged in an array, and any of the holographic optical element lenses being configured to converge a ray of light.

6. The mixed reality display device according to claim 5, wherein the holographic optical element lenses are produced by a recording of the interference between a plane wave and a spherical wave, and the holographic optical element lenses are produced by repeating the above step at different positions on a same holographic photosensitive film to produce the holographic optical element lenses, so that the second volume holographic optical element is composed into a form of an array.

7. The mixed reality display device according to claim 6, wherein the second diffractive optical element comprises a plurality of diffractive optical element lenses, the diffractive optical element lenses being arranged in an array, and any of the diffractive optical element lenses being configured to diverge or converge a ray of light.

8. The mixed reality display device according to claim 7, wherein any of the holographic optical element lenses forms a beam shrinking afocal system together with one that corresponds in position of the diffractive optical element lenses in the second diffractive optical element.

9. The mixed reality display device according to claim 7, wherein a mask element is further provided between the second diffractive optical element and the waveguide element, and is configured to eliminate a phenomenon of crosstalk between the diffractive optical elements lenses.

10. The mixed reality display device according to claim 7, wherein the diffractive optical element lenses diffract particular polarization light to form diffraction light, and a polarization of the diffraction light of each diffractive optical element lens is orthogonal to a polarization of the diffraction light from its neighboring diffractive optical element lens such that a phenomenon of crosstalk between the diffractive optical element lenses is eliminated.

11. The mixed reality display device of claim 1, wherein an air layer is provided between the second diffractive optical element and the waveguide element.

12. The mixed reality display device of claim 1, wherein the first volume holographic optical element comprises a plurality of volume holographic gratings formed at different positions in a same photosensitive material in plane wave interference recording at different angles, the volume holographic gratings being arranged in an array, and each of the volume holographic gratings corresponding to a different Bragg condition.

13. The mixed reality display device of claim 1, further comprising:

an eye movement tracking camera located on the first side of the waveguide element.

14. The mixed reality display device of claim 13, further comprising:

a beam splitter located between the waveguide element and the image display device and configured to transmit an image of a human eye to the eye movement tracking camera.

15. The mixed reality display device of claim 1, further comprising:

an eye movement tracking camera located on the second side of the waveguide element; and a third volume holographic optical element located on the first side of the waveguide element and configured to transmit an image of a human eye to the eye movement tracking camera, wherein the third volume holographic optical element comprises a reflective volume holographic element.

16. The mixed reality display device of claim 1, further comprising:

an eye movement tracking camera located on the second side of the waveguide element; and a third diffractive optical element located on the first side of the waveguide element and not overlapping with the image display device in a first direction, and configured to transmit an image of a human eye to the eye movement tracking camera.

* * * * *